Patented July 1, 1947

2,423,102

UNITED STATES PATENT OFFICE 2,423,102

RENDERING OF FATTY MATERIALS

Havard L. Keil, Clarendon Hills, Ill., assignor to Armour and Company, Chicago, Ill., a corporation of Illinois No Drawing. Application October 16, 1943, Serial No. 506,573

12 Claims. (Cl. 195—3)

This invention relates to the treatment of fatty materials and deals particularly with the rendering of fats from animal fatty materials. In a specific sense the invention relates to the rendering of lard from pork fat materials commonly available for such purposes at packing houses, but the invention is adaptable to the rendering of other fats as well.

In the rendering of lard the methods which have been used in commercial practice involve subjecting the pork fat to relatively high temperatures and elevated pressures. Temperatures of about 275° to 350° F. and pressures of about 40 lbs. to 80 lbs. per square inch above atmospheric pressure have commonly been used. Such practices have been employed for many years and have come to be regarded as standard throughout the industry.

There are several disadvantages inherent in the rendering processes which have been used in the past. For one thing, the required conditions are such as to result in a breakdown of the natural molecular formation of the fats and the release of free fatty acids. Also, the chemical character of the fats is not altered in the same way in different batches of fatty material with the result that the products are not uniform in character. The conditions required for these processes appear to destroy the natural anti-oxidant properties of the fat and render the fat somewhat unstable and easily turned rancid. Another serious disadvantage lies in the effect of such conditions on certain impurities such as curing agents and inorganic salts which are present especially in some kinds of fatty materials commercially employed. In these prior practices it appears that the sugars and other impurities are caramelized to produce objectionable odors and flavors in the products, and, too, these impurity substances produced appear also to act as catalysts in producing a further splitting of the fats. These are serious disadvantages especially when such materials as cured pork fat trimmings are being rendered.

An important object of the present invention is to discover methods for rendering the animal fatty materials which will give uniform products of good taste and odor and in which the objectionable effects of the prior processes are avoided. Another object is to produce a product which will be less easily turned rancid under the normal conditions of marketing and use. Yet another object is to provide processes which will accommodate the same raw materials as have heretofore been used in commercial rendering operations and which are easily adaptable to large scale commercial practice.

Also, the prior methods have required a substantial rendering time and a substantial amount of heat to maintain the required temperatures for such times. For example, in the usual rendering procedure, the high temperatures and pressures must be maintained for from 8 to 12 hours. This places a limitation on the production which can be attained with a given amount of equipment and is a considerable economic factor in view of the heating cost, the labor cost, etc. It is a further object of the invention to provide processes which can be performed in a much shorter time and which will require less heat and other operating expense.

I have discovered that a very good grade of rendered fat can be obtained from the common animal fatty materials by first conditioning the materials by treatment with a proteolytic enzyme, and subsequently subjecting the conditioned materials to the action of heat in excess of 140° F. I have further found that it is better to conduct the treatment at a pH in excess of 6.0, preferably between 6.0 and 7.5. This is surprising in view of the fact that the optimum activity of papain, for example, is substantially below this range of pH.

In general, my process is performed by adjusting the pH of the fatty material to between 6.0 and 7.5 by the addition of alkali such as caustic soda or an acid such as hydrochloric acid according to whether the material is originally below or above this range. When the material to be rendered is naturally within the pH range of 6.0 to 7.5 no adjustment need be made. Though a pH in excess of 7.5 may be used, better results are obtained with a pH within the range given. A proteolytic enzyme material is mixed with the fatty material to bring the enzyme into intimate contact with the protein tissues holding the fat. Then the enzyme treated material, still in its original form, unrendered and undigested, is subjected to heat of 140° F. or more, preferably between 140° F. and 185° F., to weaken or break down the protein tissues holding the fat cells sufficiently to release the fat. Though it is desirable to adjust the pH to between 6.0 and 7.5, if adjustment be necessary, before the conditioning step and the mixture with the enzyme, such adjustment may be made subsequent to the conditioning step and before the heat treatment step, if desired.

Any proteolytic enzyme can be used in the improved process, but not all enzymes act alike and some are more advantageous than others.

In general, I find the plant enzymes such as papain, bromolein and ficin, especially papain, are superior to the animal enzymes. However, the animal enzymes such as trypsin, pepsin and combinations of tryptic enzymes such as pancreatin can be used to produce excellent results. Of the animal enzymes I find the tryptic enzymes such as pancreatin or trypsin especially effective. The amounts of the enzymes used in this improved procedure may vary over wide limits. However, it is not necessary to use more than a very small amount. I can use very much less than would be required to digest even the membranous proteinaceous tissue holding the fat, not considering the gelatinous masses such as bits of gristle, skin, etc., usually found in such fatty matter. It appears necessary to use only enough of the enzyme material to bring the enzyme into contact with substantially all portions of the fatty material, and in general the more efficient the mixture the less enzyme material is required. Extremely small amounts may be used and I prefer to use of the order of 0.005% to 0.020% of enzyme material, based on the total weight of animal fatty tissue rendered. Even lower amounts may be used in certain instances. Such small amounts are, of course, incapable in themselves of producing digestion of the protein in the fat to the extent necessary for rendering the same even though the pH be maintained at the optimum point and the time be extended indefinitely.

In conducting the enzyme conditioning step, it is well to get the enzyme material into as intimate contact with the fatty material as the circumstances will permit. Preferably the fatty matter may be hashed or otherwise broken up to allow greater contact with the enzymes. Also, it is easier to obtain intimate mixture if a small quantity of water is added so that the enzyme is carried to all exposed surfaces of the fatty tissues. I have found that 5% or 10% of water, based on the amount of fatty tissues being rendered, is suitable for this purpose, but greater quantities, such as 50%, may be used. The process may, if desired, be practised without the addition of any water since the natural protein tissues themselves contain sufficient moisture to effect a breakdown and release of the fat when following the process herein described.

No specific temperatures of the fat or the enzymes are required in this conditioning step, and room temperatures may be used, or the mixing may be done at whatever temperature the ingredients happen to be, but, of course, the temperatures should not be so high as to destroy the enzymes, which means that when using trypsin or pancreatin, for example, the temperature must not be above about 130° F. or when using papain above about 180° F. It is significant that it is not necessary to use a temperature at which the enzyme used is especially active. In fact, somewhat better control may be obtained when the temperatures below the range of optimum action of the enzymes are used. In such cases there is less danger of unwanted formation of degradation products through enzymic digestion.

Conveniently the fatty material and enzyme material may be mixed in a jacketed container provided with some kind of mechanism for mixing. Suitably this same mechanism may serve also for breaking up the larger pieces of fatty material and hashing them into smaller pieces. When the enzyme material has been brought into intimate contact with all portions of the fatty tissue so far as possible, the mixture may be heated as by the use of steam, to a temperature in excess of 140° F., and preferably between 140° F. and 185° F. The effect of the heat on the previously conditioned fatty tissue is to so weaken or break down the membranous protein matter holding the fat cells that the fat is released. Higher temperatures than 185° F. may be used through to no particular advantage in producing the breakdown, and subject to the disadvantage that the higher temperatures are very likely to have a deleterious effect on the quality of the final product. The temperatures attained through heating need not be maintained and the wanted effect takes place substantially as soon as the elevated temperatures are attained. The heating of the conditioned material is preferably accomplished as quickly as practicable and the heating may be discontinued immediately as soon as the elevated temperature is reached. I have found that no elements of time are involved and that the fatty material to be rendered can be mixed with the enzyme material and heated as quickly as possible to the elevated temperature, and that immediately upon attaining this temperature the fat is liberated.

Where the fatty material is enzyme conditioned at a temperature in excess of 140° F. this temperature may be utilized to carry out the heat effect. In such cases the effect of heat in breaking down or weakening the enzyme conditioned proteins is obtained immediately as soon as the conditioning is accomplished by the contact of the enzyme with the fatty material. However, even when using papain which would enable the conditioning step to be carried out at 140° F. or above, I prefer to mix in the enzyme and so condition the material while it is still cool or under 100° F.

Given sufficient time, the solid protein matter will collect with the water that has been added and the fat may be separated by decanting. However, other preferred methods of separation may be used.

A better way of separating the freed fat is by centrifuging the mixture of fat, water and protein matter to remove the water and protein in the heavier fraction; or, the mixture may be evaporated to dryness and the protein removed by filtering or screening.

Another modified practice involves placing the fatty material to be rendered together with the enzyme material in a container adapted to be heated and provided with means for maintaining the contents under reduced pressure. A vacuum may be drawn so as to reduce the boiling point of the mixture within the container to below the temperature at which the proteolytic enzyme used is destroyed and the mixture boiled at this temperature, the boiling or ebullition of the mass serving to produce much more efficient contact of the enzyme with the proteins. Then the vacuum may be reduced allowing the pressure within the container to rise while supplying heat to raise the temperature in excess of 140° F., preferably not over 185 F., though in some cases higher temperatures may not be particularly objectionable.

It is preferable that the boiling or ebullition of the mass be continued until the temperature is raised to the point where the fat is released. I prefer, when using the above described procedure employing a vacuum, to use equipment having mechanical means for stirring and breaking up the larger fat pieces at the same time the enzyme material is being mixed in. By this practice I am able to more easily render the fat materials as they come from the cutting departments of the packing house and without a separate hashing operation.

It is advantageous to boil the rendered fat to dryness with the use of vacuum, and preferably this additional boiling to dry the fat is done after the temperature is raised to a point sufficient to destroy the enzyme if this has not been done in a prior step. However, in the usual practice the amount of the enzyme material used is insufficient to produce any substantial digestion of the protein matter through enzymic action during the length of time needed for the operations, but in any event it is well to cause the temperature to be raised to the point of enzyme destruction, before there is a chance for any breakdown of tissues into degradation products through digestion by enzymic action.

The effect of the conditioning treatment in accentuating or catalyzing the results of heat treatment, is not disturbed by an intermediate washing step, if such washing is desired. Immediately after admixing the enzyme material and conditioning has been effected, the protein material may be flushed and washed with water without disturbing the catalyzing effect upon aplication of heat.

After the fat and protein material has been dried as above explained, the mass may be removed from the container and the solid protein matter separated in any suitable way, such as by filtering or straining. It is quite satisfactory merely to pass the fat through a screen of medium mesh which serves to restrain the protein tissues. The result is fat which is dry, of good color and odor, bland to the taste, and which is very low in free fatty acid content.

That the breakdown of tissues to release the fat is not, in my process, produced through digestive action by the enzymes, is made clear by the fact that the amount of the enzymes, for example, papain, can be very much less than would be required to digest the tissues to the point where they will release the fat even at a pH and a temperature most favorable to the action of such enzymes.

It is also clear that the breakdown of tissues to release fat in the improved process is not due to a normal heat effect since in the absence of the enzyme conditioning step far greater temperature and times are required in order to accomplish a breakdown in any way equivalent to that obtained in the present process using relatively low temperatures and relatively short times of treatment.

Though my processes are applicable to animal fats in general, they are particularly adapted to the rendering of lard and in connection with lard they are especially advantageous in the rendering of cured pork fat, such as fat trimmings from cured meats which are sometimes referred to in the packing industry as "sweet pickle trimmings," the lard from such stock being called "sweet pickle lard."

In the case of cured fat, my process can be applied to produce a lard product which has far better quality than the products which have been commercially prepared from such stock in the past. It will be observed that my improvements make lower rendering temperatures possible, and this, I believe, may be largely responsible for the elimination of certain objectionable colors and odors which were prevalent especially with cured fat stock when rendering by prior methods.

The use of a pH above 6.0 is important in the production of a fine quality product, and I am able to use a pH this high, even though it is outside the optimum range of proteolytic enzymic activity, because in this process the weakening or breakdown of the tissues to release the fat is not achieved through enzymic digestion but through heat breakdown of the enzyme conditioned proteins, and the pH at which the conditioning and breakdown takes place is substantially immaterial so far as accomplishing the breakdown effect is concerned. But the pH is, I have found, important in considering the quality of the final product. In order to be sold under the jurisdiction of the Board of Trade it is necessary that the free fatty acid content of a lard product be below 0.5%. This standard is difficult to meet by prior methods of rendering even when using high quality stock, and it can not be met commercially with such methods when using the cured pork fat.

By using a pH of from 6.0 to 7.5 in the process of the present invention, a product can be obtained which is well below 0.5% in free fatty acid content even when using the cured pork fat, and usually the free fatty acid content can be held down to as low as 0.25%.

Another advantage of my process is that the proteins are not digested and are not brought into solution, but remain in a solid form. In such form they are easily removed from the fat.

It is obvious that the practice of the improved process is subject to wide variation and modification all within the spirit of the invention. The foregoing detailed description has been given for purposes of explanation only and no limitation is intended to be understood therefrom, and it is intended to include in the scope of the invention all subject matter falling within the scope of the appended claims.

This application is a continuation in part of my application Serial No. 351,277, filed August 3, 1940.

What I claim and desire to secure by Letters Patent is:

1. A process for rendering fats from animal fatty materials wherein said fats are held by protein tissue comprising conditioning said fatty materials by mixing therewith a proteolytic enzyme material, and while said fat is still held by said tissue heat treating said conditioned material to produce liberation of the fats from the protein tissue by subjecting said conditioned material at a pH in excess of 6.0 to the action of heat in excess of 140° F., and separating the released fat from the protein matter.

2. A process as set forth in claim 1 wherein said conditioned material is heat treated at a pH of from 6.0 to 7.5.

3. A process as set forth in claim 1 in which said conditioned material is subjected to temperatures of from 140° F. to 185° F.

4. A process for rendering lard fat from pork fatty materials wherein said fat is held by protein tissue comprising conditioning said materials by mixing therewith a proteolytic enzyme material, and while said fat is still held by said tissue heat treating said conditioned material to produce liberation of lard fats from the proteins by subjecting said conditioned material at a pH in excess of 6.0 to the action of heat in excess of 140° F., and separating the released lard fat from the protein matter.

5. A process as set forth in claim 4 wherein said lard fatty material is cured pork fat.

6. A process for rendering fats from animal fatty materials wherein said fat is held by protein tissue comprising conditioning said fatty materials by mixing therewith a proteolytic enzyme material, while said fat is still held by said tissue heat treating said conditioned material to produce liberation of the fats from the proteins by subjecting said conditioned material at a pH in excess of 6.0 to the action of heat in excess of 140° F., and evaporating the fats so liberated to dryness under reduced pressure.

7. A process for rendering fats from animal fatty materials wherein said fat is held by protein tissue comprising conditioning said fatty materials by mixing therewith a proteolytic enzyme material to produce liberation of the fats from the proteins, adding water to said fatty materials, and while said fat is still held by said tissue heat treating said conditioned material in the presence of said water to produce liberation of the fats from the proteins by subjecting said conditioned material at a pH in excess of 6.0 to the action of heat in excess of 140° F., evaporating the mixture of released fat and water to dryness at reduced pressure, and separating the released fat from the protein matter.

8. A process as set forth in claim 7 in which said water is not in excess of 10% by weight of the amount of said fatty material.

9. A process as set forth in claim 1 in which said proteolytic enzyme material is a papain material.

10. A process for rendering fats from animal fatty materials comprising conditioning said fatty materials by mixing therewith an animal proteolytic enzyme material, heat treating said conditioned material to produce liberation of the fats from the proteins by subjecting said conditioning material at a pH in excess of 6.0 to temperatures in excess of the temperature at which the enzymes of said enzyme matrial are destroyed, and separating the released fat from the protein matter.

11. A process for rendering fats from animal fatty materials wherein said fats are held by protein tissue comprising conditioning said fatty materials by mixing therewith a proteolytic enzyme material, and heat treating said conditioned material to produce liberation of the fats from the proteins by subjecting said conditioned material while fats are still held by said tissue at a pH in excess of 6.0 to a temperature in excess of the temperature of destruction of enzymes in said enzyme material, and separating the released fat from the protein matter.

12. A process for rendering fats from animal fatty materials wherein said fats are held by protein tissue comprising conditioning said fatty materials by mixing therewith a proteolytic enzyme material while said fat is still held by said tissue, said enzyme material being in an amount of from 0.005% to 0.020% by weight of said fatty material, and while said fat is still held by said tissue, heat treating said conditioned material to produce liberation of the fats from the protein tissue by subjecting the tissue at a pH in excess of 6.0 to the action of heat in excess of 140° F., and separating the released fat from the protein material.

HAVARD L. KEIL.

REFERENCES CITED

The following references are of record in the file of this patent:

UNITED STATES PATENTS

| Number | Name | Date |
|---|---|---|
| 76,974 | Barton | Apr. 21, 1868 |
| 766,628 | Kerr | Aug. 2, 1904 |
| 1,892,449 | Dengler | Dec. 27, 1932 |
| 1,922,484 | Mapson | Aug. 15, 1933 |
| 2,172,531 | Ekhard | Sept. 12, 1939 |
| 2,316,621 | Renner | Apr. 13, 1943 |

FOREIGN PATENTS

| Number | Country | Date |
|---|---|---|
| 9,760 | Australia | July 7, 1933 |